(12) United States Patent
Uchiyama

(10) Patent No.: US 7,172,049 B2
(45) Date of Patent: Feb. 6, 2007

(54) OCCUPANT CRUSH PROTECTION SYSTEM

(75) Inventor: Chiharu Uchiyama, Kariya (JP)

(73) Assignee: Denso Corporation, Kariya (JP)

( * ) Notice: Subject to any disclaimer, the term of this patent is extended or adjusted under 35 U.S.C. 154(b) by 283 days.

(21) Appl. No.: 10/800,723

(22) Filed: Mar. 16, 2004

(65) Prior Publication Data

US 2004/0182630 A1    Sep. 23, 2004

(30) Foreign Application Priority Data

Mar. 19, 2003    (JP)    ............... 2003-075371

(51) Int. Cl.
*B60K 28/14*    (2006.01)
(52) U.S. Cl. .................................. 180/282
(58) Field of Classification Search ........ 180/282, 180/283; 280/734, 735, 802, 807
See application file for complete search history.

(56) References Cited

U.S. PATENT DOCUMENTS 5,415,431 A * 5/1995 Omura ................ 280/805

FOREIGN PATENT DOCUMENTS

| JP | A-59-77942 | 5/1984 |
| JP | A-5-238355 | 9/1993 |
| JP | 10147208 A * | 6/1998 |

* cited by examiner

Primary Examiner—Faye M. Fleming
(74) Attorney, Agent, or Firm—Posz Law Group, PLC

(57) ABSTRACT

An occupant crush protection system for a vehicle includes an occupant protection device, such as a seatbelt retraction device, powered by a vehicle battery, a device control unit for controlling the occupant protection device, a relay circuit, a sensor for sensing high possibility of collision and a relay control circuit for bringing the relay to a power supply state only when the sensor senses high possibility of collision.

9 Claims, 3 Drawing Sheets

OCCUPANT CRUSH PROTECTION SYSTEM

CROSS REFERENCE TO RELATED APPLICATION

The present application is based on and claims priority from Japanese Patent Application 2003-75371, filed Mar. 19, 2003, the contents of which are incorporated herein by reference.

BACKGROUND OF THE INVENTION

1. Field of the Invention

The present invention relates to an occupant crush protection system which protects an occupant of a vehicle from impact shocks when the vehicle comes into collision with an object such as a car or a wall.

2. Description of the Related Art

A seatbelt retraction device is a well-known device of protecting an occupant of a vehicle from an accidental collision. Such a seatbelt retraction device includes an electric motor, a motor driving circuit and a relay circuit to retract a seatbelt so that an occupant can fasten the seatbelt without slackness. Such a seatbelt retraction device may include a pre-collision sensor which predicts a collision. In this case, the electric motor retracts the seatbelt according to a signal of the pre-collision sensor. Usually, the electric motor is powered by a vehicle battery trough the relay circuit, which is always turned on so that the slackness of the seatbelt can be always controlled. Accordingly, a considerable amount of electric power is wasted in the motor driving circuit even when the seat belt system is not operated.

SUMMARY OF THE INVENTION

Therefore, the present invention has been made to solve the above-described problem.

According to a main feature of the invention, an occupant crush protection system for a vehicle includes an occupant protection device such as a seatbelt retraction device powered by a vehicle battery, a device control unit for controlling the occupant protection device, a relay, sensing means for sensing high possibility of collision and relay control means for bringing the relay to a power supply state only when the sensing means senses a high possibility of collision.

Therefore, battery power is only necessary for a very short time.

In the above described occupant crush protection system the sensing means may include a hazardous object sensor for detecting an object to collision. The sensing means may be a sensor for detecting an emergent braking, and the device control means may be means for operating the occupant protection device when the sensing means senses a high possibility of collision. The occupant protection device may be operated when the sensing means detects an emergent braking or an object to collision.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

An occupant crush protection system according to the first embodiment of the invention will be described with reference to FIGS. 1–3.

Figure 1:
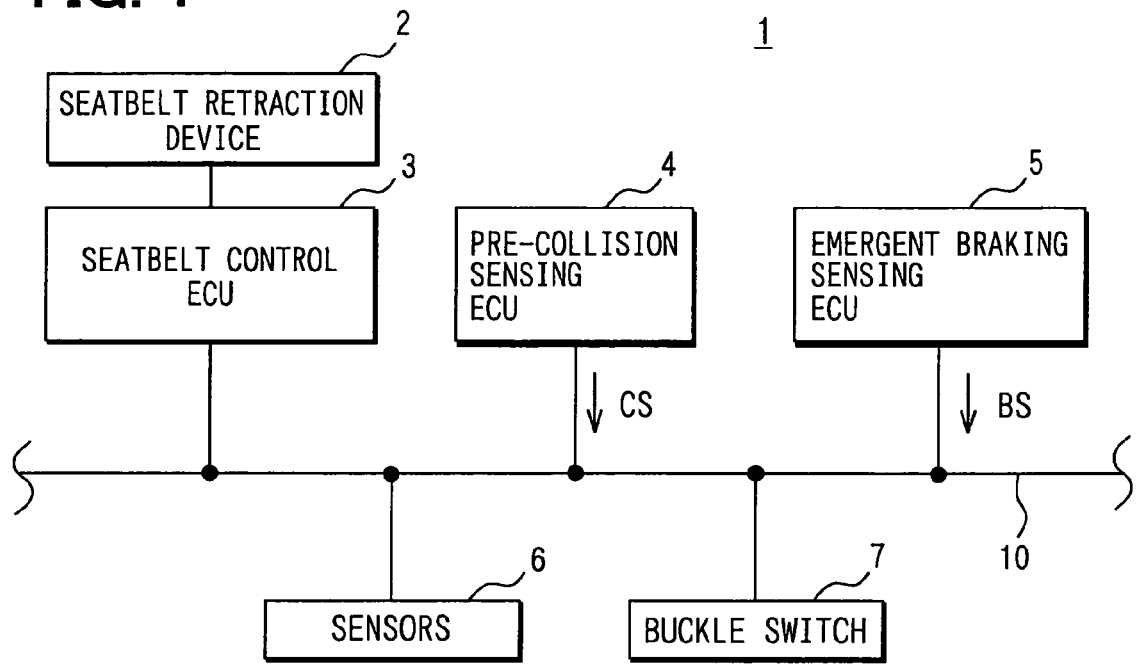
FIG. 1 is a block diagram illustrating an entire structure of an occupant crash protection system according to the first embodiment of the invention.
Figure 2:
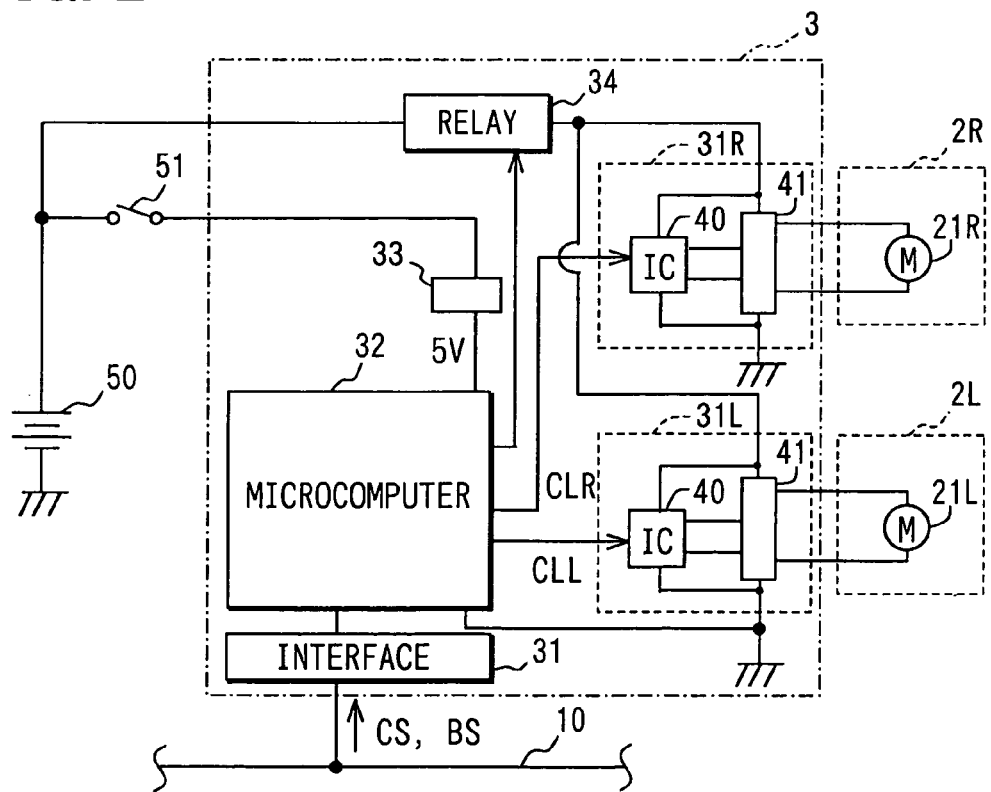
FIG. 2 is a block diagram of an entire structure of the seatbelt retraction device and the seat belt ECU shown in FIG. 1.

As shown in FIG. 1, the occupant collision protecting system 1 includes a seatbelt retraction device 2, a seatbelt control ECU 3, a pre-collision sensing ECU 4, an emergency braking sensing ECU 5, also referred to herein as an emergent-braking sensing ECU 5, a variety of sensors 6, a buckle switch 7 and an in-vehicle LAN 10. As shown in FIG. 2, the seatbelt retraction device 2 is controlled by the seatbelt control ECU 3. The seatbelt refraction device 2 includes right and left seatbelt refraction units 2R, 2L, each of which has its own electric motor 21R, 21L. The seatbelt control ECU 3 includes right and left motor driving circuits 31R, 31L, each of which drives the right or left motor 21R, 21L. The seatbelt control ECU 3 also includes a microcomputer 32 that has a CPU, a ROM, an I/O port, which are not shown here. The microcomputer 32 is connected to the in-vehicle LAN 10 via art interface 31. The microcomputer 32 receives a pre-collision signal CS from the pre-collision sensing ECU 4, an emergent braking signal BS from the emergent braking sensing ECU 5, various signals from the respective sensors 6 and a switch signal from the buckle switch 7. The microcomputer 32 may operate the seatbelt retraction device 2 to hold an occupant when it receives the pre-collision signal.

The seatbelt control ECU 3 is powered by the battery 50 when an ignition switch 51 is turned on and continues to operate until the ignition switch 51 is turned off. The microcomputer 32 is supplied with electric power of 5 V, which is converted by a voltage regulator 33 from the terminal voltage of the battery 50.

The motor driving circuits 31R, 31L, are powered by the battery 50 via a relay circuit 34. The switching operation of the motor driving circuits 31R, 31L is controlled by the microcomputer 32. Each of the motor driving circuits 31R, 31L has a control IC unit 40 and a bridge circuit 41. When the relay circuit 34 turns on, the control IC unit 40 is powered by the battery 50.

The microcomputer 32 executes a program stored in the ROM to determine whether to retract the seatbelt when it receives a signal via the in-vehicle LAN 10 and provides the control IC units 40 of the motor driving circuits 31R, 31L with control signals CLR, CLL. The microcomputer 32 also determines whether to turn on or off the relay circuit 34 to provide an ON or an OFF state.

When the control IC units 40 receive the control signals CLR, CLL, they control the respective bridge circuits 41 to control the motors 21R, 21L. When the control IC units 40 of the motor driving circuits 31R, 31L respectively receive the control signals CLR, CLL, they respectively control the motors 21R, 21L via the bridge circuits 41.

Figure 3:
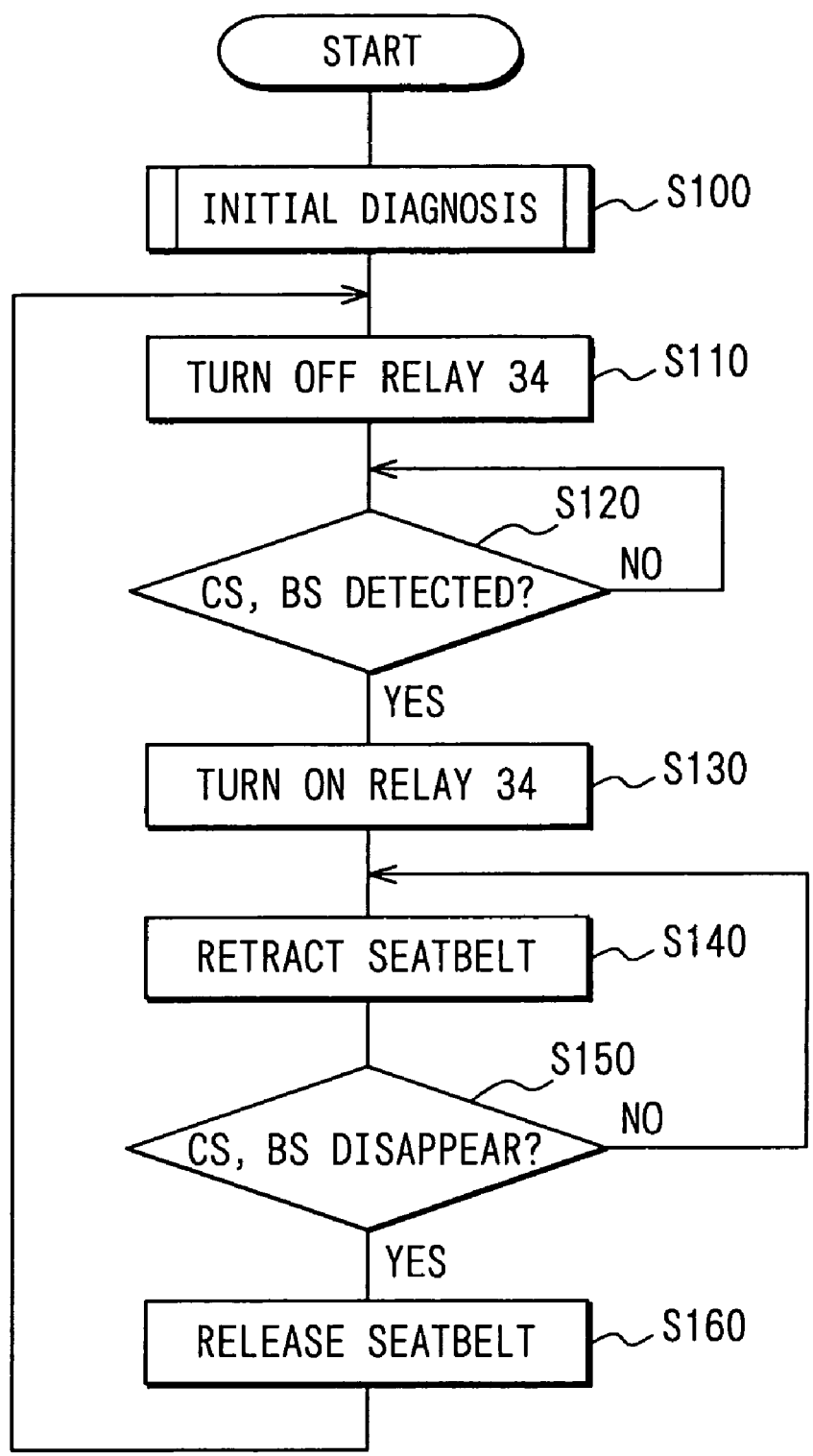
FIG. 3 is a flow diagram of operation executed by the seatbelt ECU.

The microcomputer 32 executes a control program, as shown in FIG. 3. When the ignition switch 51 is turned on, an initial diagnosis is carried out at S100 to find out any abnormality of the seatbelt control ECU 3. When the microcomputer 32 and its signal transmission via the interface 31 are found to be normal, the relay circuit 34 is turned on to supply electric voltage to the motor driving circuits 31R, 31L to find out any abnormality. If no abnormality is found, step 110 follows to turn on the relay circuit 34. Thereafter, the pre-collision signals CS or the emergent braking signal BS is sensed or not is examined at S120. If the result of S120 is NO, this examination of this step is repeated until the result becomes YES.

If the result of S120 is YES, that is, if the pre-collision signal CS or the emergent braking signal BS is sensed, the relay circuit 34 is turned on at S130. Subsequently at S140, the microcomputer 32 sends the control signals CLR, CLL to the respective motor driving circuits 31R, 31L to drive the motors 21R, 21L so that the respective seat belts can have a suitable tension. The control at S140 is executed only when the buckle switch 7 provides the switch signal indicating that the seatbelt is fastened. Thereafter, whether the pre-collision signal CS or the emergent braking signal BS disappears or not is examined at step 150. If the result of S150 is NO, the steps S140 and S150 are repeated.

If the result of S150 is YES, S160 follows to release the seatbelt or to restore the seatbelt to a previous state. Thereafter, the step returns to S110 to turn off the relay circuit 34 and the following steps 120-160 are repeated.

Thus, the relay circuit 34 is turned on to power the motor driving circuits 31R, 31L only if a high possibility of collision is detected while the diagnosis is carried out. That is, the occupant crush protection system according to the invention provides a power supply state just before the seatbelt retraction device 2 is operated and power cut state after the seatbelt retraction device has been operated. Therefore, the power supply state only lasts for a short time, so that the power consumption of the seatbelt retraction device 2 is very small.

Figure 4:
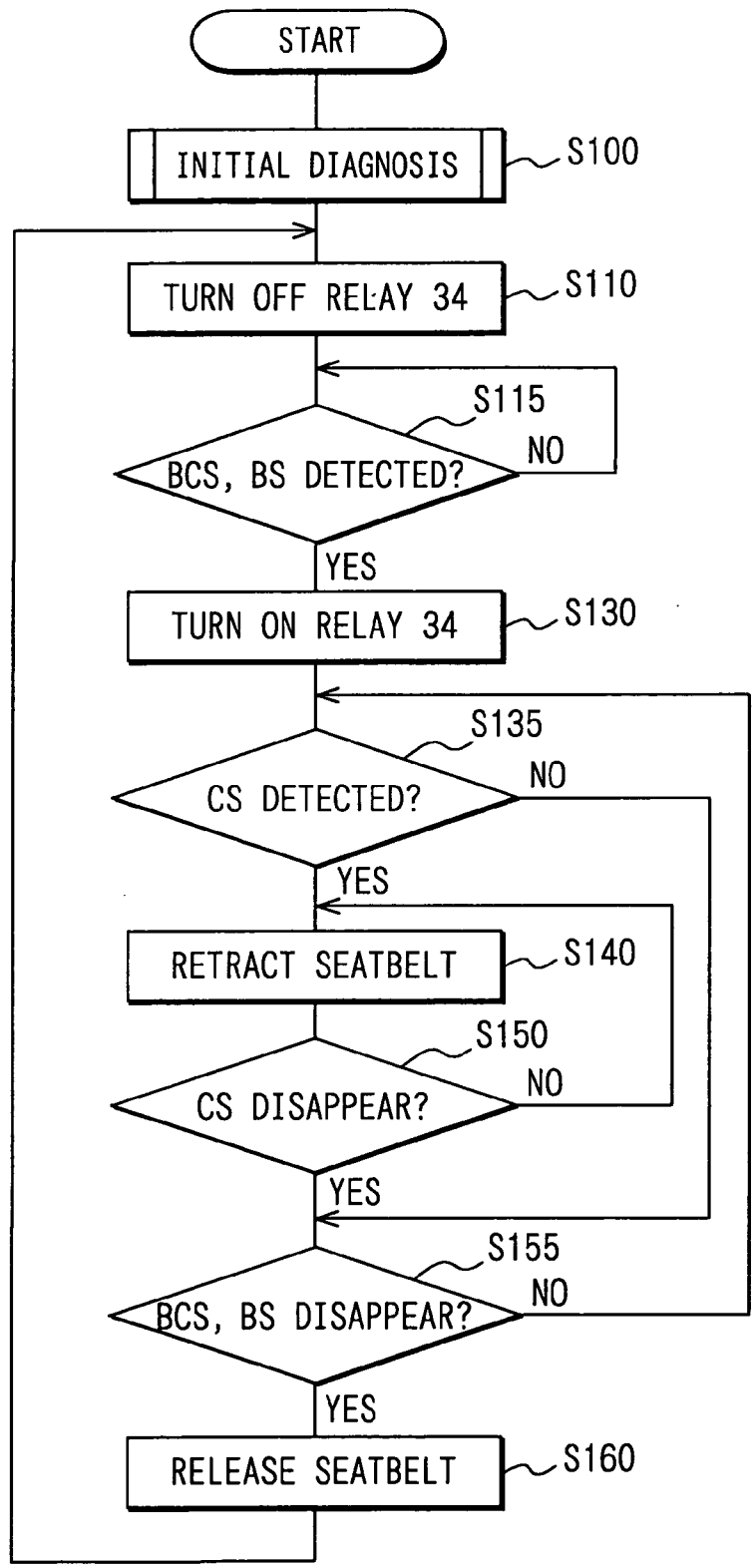
FIG. 4 is a flow diagram of operation executed by a seatbelt ECU of an occupant crush protection system according to the second embodiment of the invention.

An occupant crush protection system according to the second embodiment of the invention will be described with reference to a flow diagram shown in FIG. 4, where the same reference numeral as the first embodiment shown in FIG. 3 represents the same or substantially the same step. In the second embodiment, the pre-collision sensing ECU 4 provides a preliminary pre-collision signal BCS before the pre-collision signal CS.

The preliminary pre-collision signal BCS is outputted to the in-vehicle LAN 10 by the pre-collision sensing ECU 4 based on one of or combination of the vehicle speed, the distance of an object from the vehicle, the running speed of the object, etc. which represent a high possibility of collision. After the step S110, whether the preliminary pre-collision signal BCS or the emergent braking signal BS is sensed or not is examined at S115.

If the result of S115 is NO, this examination of this step is repeated until the result becomes YES. On the other hand, if the result of S115 is YES, the relay circuit 34 is turned on at S130. Then, whether the pre-collision signal CS, which represents higher possibility of collision than the preliminary pre-collision signal BCS as in the first embodiment, is detected or not is examined at S135.

If the result of S135 is NO, S155 follows to examine whether the preliminary pre-collision signal BCS and the emergency braking signal BS disappear or not. On the other hand, if the result of S135 is YES, S140 follows, so that the microcomputer 32 sends the control signals CLR, CLL to the respective motor driving circuits 31R, 31L to drive the motors 21R, 21L thereby to provide the respective seat belts with a suitable tension.

Thereafter, whether the pre-collision signal CS disappears or not is examined at step 150. If the result of S150 is NO, the steps S140 and S150 are repeated. On the other hand, if the result of S150 is YES, S155 follows to examine whether the preliminary pre-collision signal BCS and the emergency braking signal BS disappear or not.

If the result of S155 is NO, the step returns to S135, so that S135, S140, S150 and S155 are repeated. On the other hand, if the result of S155 is YES, S160 follows to release the seatbelt or to restore the seatbelt to a previous state, and the step returns to S110 to turn off the relay circuit 34 and the following steps 120–160 are repeated.

Thus, because the seatbelt retraction device 2 is not operated until two signal examination steps are executed, more reliable or noise-free occupant crush protection system can be provided.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An occupant crush protection system for a vehicle comprising:
    a battery mounted in the vehicle;
    an occupant protection device having an electric actuator powered by the battery;
    a device control unit for controlling said occupant protection device;
    a relay for providing a power cut state for cutting power supply to said electric actuator and a power supply state for supplying power to said electric actuator from the battery;
    sensing means for sensing a high possibility of collision; and
    relay control means for bringing said relay to the power supply state only when said sensing means senses the high possibility of collision.

2. The occupant crash protection system as claimed in claim 1, wherein said sensing means comprises a hazardous object sensor for detecting an object to be collided.

3. The occupant crush protection system as claimed in claim 1, wherein said sensing means comprises a sensor for detecting emergency braking.

4. The occupant crush protection system as claimed in claim 1, wherein said device control unit comprises a means for operating said occupant protection device when said sensing means senses a high possibility of collision.

5. The occupant crush protection system as claimed in claim 3, wherein said device control unit comprises means for operating said occupant protection device when said sensing means detects emergency braking.

6. The occupant crush protection system as claimed in claim 1, wherein said device control unit comprises means for operating said occupant protection device when said sensing means detects an object to be collided.

7. The occupant crush protection system as claimed in claim 1, wherein said occupant protection device comprises a seatbelt retraction device.

8. An occupant crush protection system for a vehicle comprising:
- a battery mounted in the vehicle;
- an occupant protection device powered by the battery;
- a device control unit for controlling said occupant protection device;
- a relay for providing a power cut state for culling power supply to said occupant protection device and a power supply state for supplying power to said occupant protection device from the battery;
- a hazardous object sensor for detecting an object with which there is a high possibility of collision; and
- a relay controller for bringing said relay to the power supply state only when said hazardous object sensor detects the object with which there is the high possibility of collision.

9. An occupant crush protection system for a vehicle comprising:
- a battery mounted in the vehicle;
- an occupant protection device powered by the battery;
- a device control unit for controlling said occupant protection device;
- a relay for providing a power cut state for cutting power supply to said occupant protection device and a power supply state for supplying power to said occupant protection device from the battery;
- a sensor for detecting an emergency braking condition indicative of a high possibility of collision; and
- a relay controller for bringing said relay to the power supply state only when said sensor senses the emergency braking condition.

* * * * *